INVENTOR.
BORIS STEFANOV
BY
Elliott & Pastoriza
ATTORNEYS

United States Patent Office 3,010,078

Patented Nov. 21, 1961

3,010,078

VOLTAGE CONTROLLED FREQUENCY CIRCUIT

Boris Stefanov, Glendale, Calif., assignor to Kauke & Company, Inc., a corporation of California Filed Sept. 21, 1959, Ser. No. 841,276
2 Claims. (Cl. 332—15)

This invention relates to a novel electrical circuit for providing an output signal of frequency which may be modulated by an input voltage.

A primary object of the invention is to provide an extremely simple and inexpensive electrical circuit for converting an amplitude modulated input voltage to a frequency modulated output signal in which such frequency over the entire modulation range is directly proportional to the particular input voltage level.

Another object is to provide a circuit meeting the foregoing objects which avoids the use of inductances in the frequency control portion of the circuit and thereby avoids manufacturing inaccuracies and temperature compensation problems associated with inductance coils.

Briefly, the invention contemplates an electrical circuit including a storage condenser in conjunction with means for repeatedly charging the condenser to a fixed voltage value in response to completion of the discharge thereof. The fixed voltage value to which the condenser is charged and the zero ground potential at complete discharge are carefully regulated so that the actual discharging takes place between fixed constant voltage limits. A discharge current control means is incorporated in the discharge path of the condenser and is arranged to vary the rate of discharge in accordance with the voltage value of an input voltage. By this arrangement, the rate of discharging of the condenser and thus the frequency of the output signals derived from the circuit may be accurately controlled by the particular value of the input voltage.

Figure 1:
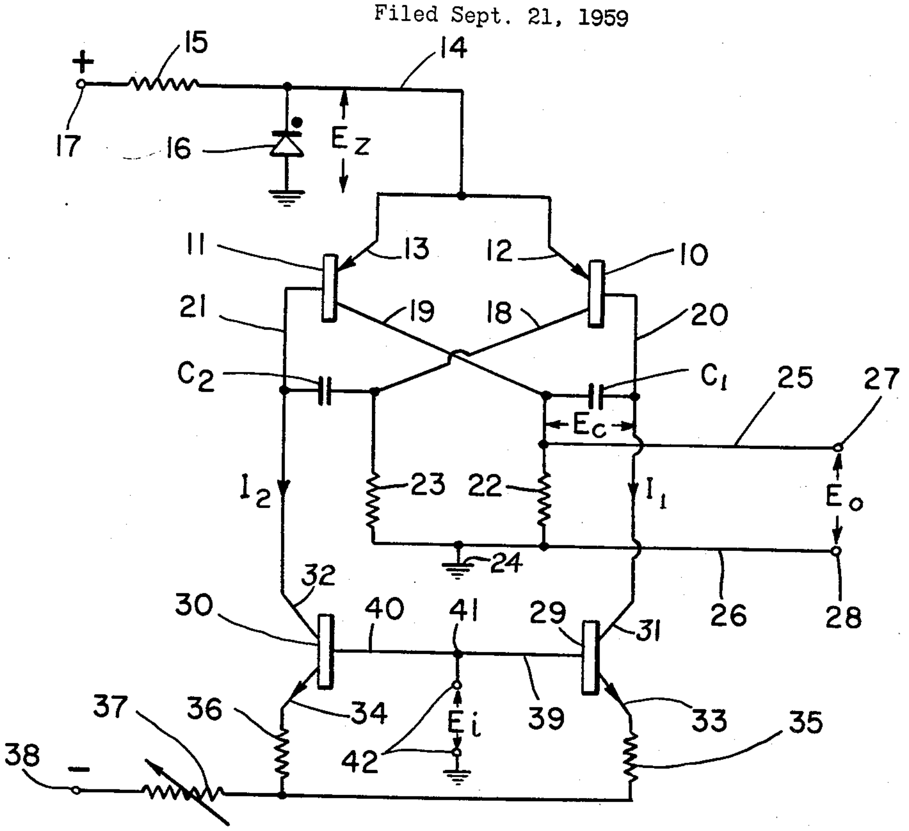
Figure 2:
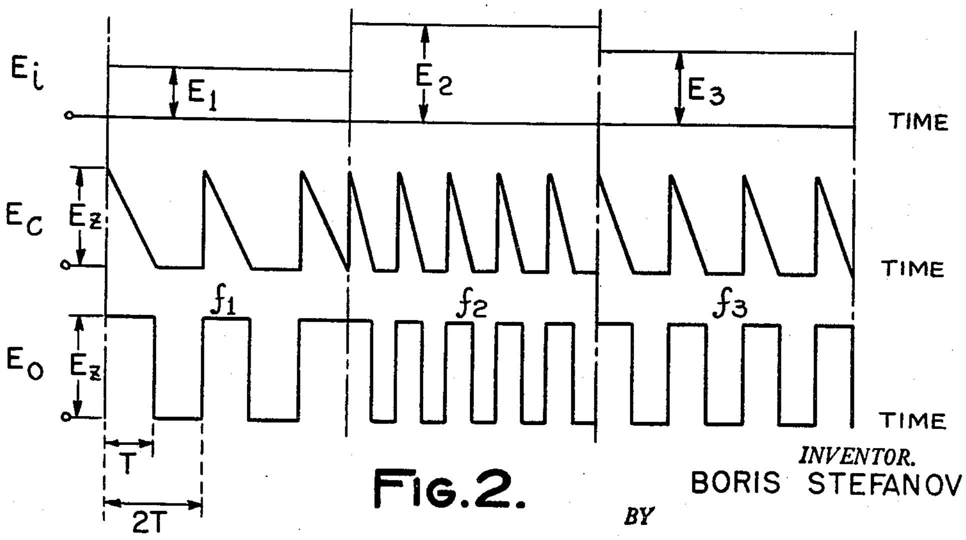

A better understanding of the invention will be had by referring to one embodiment thereof as illustrated in the accompanying drawings, in which:

FIGURE 1 is a schematic diagram of the voltage controlled frequency circuit; and, FIGURE 2 illustrates a series of wave forms useful in explaining the operation of the circuit of FIGURE 1.

Referring first to FIGURE 1, there are shown first and second transistor elements 10 and 11 having emitter terminals 12 and 13 connected together to a common input lead 14. A fixed voltage is maintained on the lead 14 by a regulator comprising resistance 15 and a zener diode 16 connected between ground and the junction point of the resistance 15 and lead 14. Input voltage from any suitable source is applied to the input terminal 17. With this arrangement, the emitter terminals are subject to a constant fixed voltage determined by the zener voltage $E_z$ of the diode 16.

The first and second transistors 10 and 11 include first and second collector terminals 18 and 19 respectively. Also included are first and second storage condensers $C_1$ and $C_2$. The first storage condenser $C_1$ has one side connected to the collector lead 19 of the second transistor 11 and the second storage condenser $C_2$ has one side connected to the first collector lead 18 of the first transistor 10. The other sides of the condensers $C_1$ and $C_2$ connect respectively to the base leads 20 and 21 for the first and second transistors as shown. Output resistances 22 and 23 in turn connect from the collector lead sides of the condensers $C_1$ and $C_2$ to ground 24.

The foregoing arrangement constitutes a multi-vibrator circuit from which an output signal in the general form of a square wave may be taken from across either one of the resistances 22 or 23. In the embodiment shown for illustrative purposes, output leads 25 and 26 connect across the resistance 22 to terminate in output terminals 27 and 28. The output voltage is indicated by $E_0$.

The current discharge paths for the condensers $C_1$ and $C_2$ include, in series, discharge current control means in the form of first and second current control transistors 29 and 30. As shown, collector terminals 31 and 32 connect to the base terminal leads 20 and 21 and the emitter terminals 33 and 34 connect through resistances 35 and 36 and a common variable resistance 37 to a negative voltage input terminal 38. The base leads 39 and 40 of the transistors 29 and 30 are tied together. An input voltage $E_i$ is applied between the base terminals and ground through suitable input terminals 42. The particular value of the input voltage $E_i$ will thus determine the voltage at the base terminals 39 and 40. This base voltage in turn will control the current passed by the transistors 29 and 30.

The operation of the circuit is as follows. If $I_1$ represents the discharge current in the base lead 20 for the condensers $C_1$ and $I_2$ the discharge current for the condenser $C_2$, the multi-vibrator action will result in the presence of $I_1$ and $I_2$ at alternate periods of time. Since the circuit is entirely symmetrical, a description of the action taking place with respect to the current $I_1$ and condenser $C_1$ will suffice, it being understood that the current $I_2$ and condenser $C_2$ function in a similar manner. Since $E_z$ is fixed by action of the zener diode 16, the condenser $C_1$ is charged to an initial fixed voltage $E_z$. If T represents ½ the period of the contemplated output wave form of the multi-vibrator, the following relationship exists:

$$\frac{I_1}{C_1}=\frac{E_z}{T}$$

Since 2T will equal the period of the output wave form, its frequency $f$ is given by $$f=\frac{1}{2T}$$

Therefore, the current $I_1$ can be expressed by:

$$I_1=C_1 2fE_z;\text{ or } I_1=K_1f$$

where $K_1$ is a constant.

On the other hand, as a consequence of the property of the current controlling transistor 29

$$I_1=K_2E_i$$

where $K_2$ is a second constant and $E_i$ is the input voltage. Thus, $$f=\frac{K_2}{K_1}E_i$$

or in other words $f$ is directly proportional to the input voltage which is the desired relationship to be effected by the circuit.

Stated differently, by changing the input voltage level $E_i$, the discharging current through the transistor 29 can be changed. Changing the value of the discharging current changes the rate of discharge which in turn will change the period of the output wave form and thus the frequency.

As an example, FIGURE 2 shows three different levels of input voltages $E_i$ indicated at $E_1$, $E_2$ and $E_3$. Considering first the input voltage level $E_1$, there will be established a constant current proportional to $E_1$ passing through transistor 29 for effecting the discharge of the condenser $C_1$. The resulting voltage $E_c$ across the condenser during discharge is indicated by the second curve $E_c$ in FIGURE 2. It will be noted that this discharge takes place between the fixed voltage $E_z$ to which the condenser is initially charged and zero potential. Moreover, the slope of the discharge curve depends on the value of the discharge current in turn controlled by the level of the input voltage.

When the condenser $C_1$ is completely discharged, the circuit is switched by action at the base 20 of the transistor 10 turning on the transistor 10 to charge the condenser $C_2$ to the input voltage $E_2$. The condenser $C_2$ then discharges during which time the voltage across the condenser $C_1$ is held at zero as soon as transistor 11 is cut off. When the discharge of $C_2$ is complete, the transistor 11 is switched on and the transistor 10 switched off and the cycle repeated. Since the discharge current $I_1$ is held constant, the voltage across the output resistances 22 and 23 will be constant during the discharge portions of the cycle. There thus results a square wave of frequency $f_1$ as shown at $E_0$ in FIGURE 2.

If now the input voltage level is changed to a higher value $E_2$ as shown in the middle portion of FIGURE 2, a higher fixed or constant current $I_1$ passes through the transistor 29 thereby resulting in an increased rate of discharge. Since the voltage limits between which the discharge takes place across the condenser $C_1$ are always the same value, the discharge is completed sooner and the switching frequency is correspondingly increased. In fact, if the input voltage level $E_1$ is doubled, as indicated by the level $E_2$ in FIGURE 2, the frequency of the output signal will similarly be doubled as indicated at $f_2$ in the lower central plot in FIGURE 2.

Finally, if the input voltage $E_1$ is now decreased to an intermediate level between $E_1$ and $E_2$ the frequency $f_3$ of the output signal will similarly assume an intermediate frequency value.

As mentioned, the wave forms across the condenser $C_2$ and output resistance 21 are identical to those shown for the voltages across the condenser $C_1$ and output resistance 20 except that they are shifted in time phase 180 degrees.

From the foregoing description, it will be evident that there is provided an extremely simple method for providing a frequency modulated signal in which the modulation is directly proportional to the modulation of an input voltage. This proportionality or linearity is, moreover, substantially perfect over a very wide range of input voltage variations, as a consequence of employing only condensers and resistances which are relatively easy to compensate for temperature variations. The use of inductances, which are difficult to manufacture with precision and compensate, is avoided by the present circuit.

Minor modifications falling within the scope and spirit of this invention will occur to those skilled in the art. The voltage controlled frequency circuit is therefore not to be thought of as limited to the particular embodiment set forth merely for illustrative purposes.

What is claimed is:

1. A voltage controlled frequency circuit for providing an output wave form of frequency directly proportional to an input voltage value, comprising, in combination: first and second transistors having emitter, collector, and base terminals; a first storage condenser connected between the collector terminal of said second transistor and the base terminal of said first transistor; a second storage condenser connected between the collector terminal of said first transistor and the base terminal of said second transistor; a fixed voltage source connected to both emitter terminals of said first and second transistors; first and second output resistances connected respectively between said collector terminals and ground; first and second discharge paths for said first and second condensers respectively; and first and second discharge current control means in said first and second discharge paths respectively and responsive to said input voltage value for providing discharge currents proportional to said input voltage value.

2. The subject matter of claim 1, in which said first and second discharge current control means comprise transistors having base, collector, and emitter terminals, said collector and emitter terminals being connected in series respectively in said first and second discharge paths, and said base terminals being connected to receive said input voltage.

References Cited in the file of this patent

UNITED STATES PATENTS

| | | |
|---|---|---|
| 2,564,687 | Guenther | Aug. 21, 1951 |
| 2,841,712 | Hoge et al. | July 1, 1958 |
| 2,894,215 | Toy | July 7, 1959 |
| 2,960,668 | Young | Nov. 15, 1960 |